United States Patent
Fuji et al.

(10) Patent No.: US 9,527,750 B2
(45) Date of Patent: Dec. 27, 2016

(54) METHOD FOR PRODUCING HOLLOW NANOPARTICLES COMPRISING HYDROTHERMAL TREATMENT

(71) Applicant: NAGOYA INSTITUTE OF TECHNOLOGY, Nagoya-shi, Aichi (JP)

(72) Inventors: Masayoshi Fuji, Tajimi (JP); Takashi Shirai, Kani (JP); Raymond V. Rivera Virtudazo, Tsukuba (JP); Chika Takai, Nagoya (JP)

(73) Assignee: NAGOYA INSTITUTE OF TECHNOLOGY, Nagoya (JP)

( * ) Notice: Subject to any disclaimer, the term of this patent is extended or adjusted under 35 U.S.C. 154(b) by 267 days.

(21) Appl. No.: 14/357,949

(22) PCT Filed: Nov. 9, 2012

(86) PCT No.: PCT/JP2012/079138
§ 371 (c)(1),
(2) Date: May 13, 2014

(87) PCT Pub. No.: WO2013/073475
PCT Pub. Date: May 23, 2013

(65) Prior Publication Data
US 2014/0287236 A1    Sep. 25, 2014

(30) Foreign Application Priority Data
Nov. 15, 2011 (JP) .................................. 2011-249255

(51) Int. Cl.
    B32B 5/16      (2006.01)
    B05D 7/00      (2006.01)
    C01B 33/24     (2006.01)
    C01B 13/32     (2006.01)
    C01F 11/12     (2006.01)

(52) U.S. Cl.
    CPC ............... *C01B 33/24* (2013.01); *C01B 13/32* (2013.01); *C01F 11/12* (2013.01); *Y10T 428/2982* (2015.01)

(58) Field of Classification Search
    CPC ........... C01F 11/12; C01B 33/24; C01B 13/32
    USPC .................... 428/402–406; 427/376.2, 397.7
    See application file for complete search history.

(56) References Cited

U.S. PATENT DOCUMENTS

| | | | |
|---|---|---|---|
| 4,647,499 A * | 3/1987 | Takahashi | C04B 28/18 106/796 |
| 5,278,106 A | 1/1994 | Nakashima et al. | |
| 8,216,961 B2 * | 7/2012 | Lee | B01J 21/063 502/240 |

(Continued)

FOREIGN PATENT DOCUMENTS

| | | |
|---|---|---|
| JP | A-04-154605 | 5/1992 |
| JP | A-06-040715 | 2/1994 |
| JP | A-2011-153057 | 8/2011 |

OTHER PUBLICATIONS

Wang et al., Thermally Stable silicate nanotubes, Angew. Chem. Int. Ed. 2004, 43, 2017-2020.*
Fuji, Hollow particles as controlled small space to functionalize materials, J. of the Cer. Soc. of Japan 123 [9] 835-844, 2015.*

(Continued)

*Primary Examiner* — Holly Le
(74) *Attorney, Agent, or Firm* — Oliff PLC (57) ABSTRACT

Hollow nanoparticles having an average particle size of 30 to 300 nm and each including a shell mainly including calcium silicate.

3 Claims, 6 Drawing Sheets

(56) References Cited

U.S. PATENT DOCUMENTS

| | | | |
|---|---|---|---|
| 8,415,267 B2* | 4/2013 | Lee | B01J 21/063 |
| | | | 502/240 |
| 2008/0090070 A1* | 4/2008 | Muraguchi | B82Y 30/00 |
| | | | 428/332 |
| 2008/0220255 A1* | 9/2008 | Chen | C01F 11/185 |
| | | | 428/404 |

OTHER PUBLICATIONS

Rivera Virtudazo et al., "Synthesis of Nano-sized Hollow Calcium Silicate Particles by Template Method Assisted with Hydrothermal Treatment," World Congress on Particle Technology (WCPT), vol. 6., 2010.

Ma et al., "Nanostrctured porous hollow eliipsoidal capsules of hydroxyapatite and calcium silicate: preparatation and application in drug delivery," Journal of Materials Chemistry, vol. 18, No. 23, 2008, pp. 2722-2727.

Rivera Virtudazo et al., "A Simple Approach to Form Hydrothermally Stable Templated Silica Nanoparticles, In Characertization and Control of Interfaces for High Quality Advanced Materials III", The American Ceramic Society, 2010, pp. 91-97.

Jul. 15, 2015 Extend Search Report in European Patent Application No. 12850399.2.

Takai et al., "Muki Template-ho o Mochiita Nano Silica Chuku Ryushi no Gosei," *Society of Powder Technology,* Japan 2011 Nendo Shunki Kenkyu Happyokai Koen Ronbunshu, May 24, 2011, pp. 27-28.

Feb. 12, 2013 International Search Report issued in International Application No. PCT/JP2012/079138 (with translation).

* cited by examiner

METHOD FOR PRODUCING HOLLOW NANOPARTICLES COMPRISING HYDROTHERMAL TREATMENT

TECHNICAL FIELD

The present invention relates to calcium silicate hollow nanoparticles and a production method thereof. The calcium silicate hollow nanoparticles have a shell mainly including calcium silicate and each have a particle size on the order of nanometers. The hollow particles are used as biomaterials and food additives and are more preferably used as supports for drugs (medicaments), cosmetic components, catalysts, fertilizers, and flavors.

BACKGROUND ART

Hollow particles have a structure of hollow space and a shell and have properties owing to the structure, such as a low density, a high specific surface area, capability of including a substance, and thermal insulating properties. Among such hollow particles, calcium silicate hollow particles having a shell including calcium silicate are usable as supports typically for drugs, cosmetic components, fertilizers, flavors, and catalysts because calcium silicate is highly chemically stable, harmless to the human body and environment, and inexpensive.

A technique relating to calcium silicate hollow particles having a particle size on the order of micrometers can be found in Patent Literature (PTL) 1.

The technique disclosed in PTL 1 yields hollow porous spherical calcium silicate microparticles having an average particle size of 3.5 µm. The technique enables the spherical calcium silicate microparticles to have a narrower particle size distribution by preparing a water-in-oil (W/O) emulsion and passing the emulsion through a porous membrane.

CITATION LIST

Patent Literature

[PTL 1]
Japanese Patent Application Publication No. JP-A-H04-154605

SUMMARY OF INVENTION

Technical Problem

Hollow particles, when having a particle size on the order of nanometers, exhibit specific properties that are not exhibited by micro-sized particles (particles having a size on the order of micrometers).

However, there has been no report on calcium silicate hollow nanoparticles having a particle size on the order of nanometers, although there has been a report on those having a particle size on the order of micrometers as in PTL 1. Accordingly, there has also been no report on a method for producing calcium silicate hollow nanoparticles having a particle size on the order of nanometers, where the method can freely control the particle size, shape, and shell thickness of the hollow particles.

According to the features of the technique described in PTL 1, the shape of microparticles produced by the technique is limited to a spherical shape alone, and it is difficult to allow microparticles to have a particle size on the order of nanometer. According to the formation mechanism of microparticles produced by the technique, it is difficult to allow the hollow microparticles to have a dense shell having pores with an average pore size of 1 nm or less and further to have a shell having a thickness of 20 nm or less.

Under such circumstances, a first object of the present invention is to provide hollow nanoparticles which have a shell mainly including calcium silicate and which have a particle size on the order of nanometers. A second object of the present invention is to provide a method for producing hollow nanoparticles which have a shell mainly including calcium silicate and which have a particle size on the order of nanometers, where the method can freely control the particle size, shape, and shell thickness of the hollow nanoparticles.

Solution to Problem

After intensive investigations, the present inventors have found hollow nanoparticles having a shell including calcium silicate, and a production method thereof to achieve the objects. Specifically, the present invention provides hollow nanoparticles and a production method thereof as follows.

The present invention provides, in a first aspect, hollow nanoparticles each having an average particle size of 30 to 300 nm and each having a shell mainly including calcium silicate.

The shell in the hollow nanoparticles may include a composite of crystalline calcium silicate and amorphous silica. The shell may have pores having an average size of 1 nm or less. The shell may have a thickness of 3 to 20 nm. The hollow nanoparticles may have a spherical, spheroidal, or cubic shape.

The present invention further provides, in a second aspect, a method for producing the hollow nanoparticles according to the first aspect. The method includes:

a first step for forming core-shell particles each having a core particle containing calcium and, on a surface of the core particle, a coating layer including amorphous silica;

a second step for converting each coating layer of each core-shell particle into a shell mainly including calcium silicate by means of hydrothermal treatment; and a third step for removing each core particle from each core-shell particle while allowing each shell of each core-shell particle to remain.

Specifically, the first step of the production method may be performed by the substeps of: dispersing the core particle in an organic solvent; and forming the coating layer on a surface of the dispersed core particle by a sol-gel reaction with a silicon alkoxide.

Heating in the hydrothermal conversion in the second step of the production method is preferably performed at a temperature of 80° C. to lower than 200° C.

Advantageous Effects of Invention

The present invention according to the first aspect achieves the first object.

The present invention according to the second aspect achieves the second object. Specifically, the particle size and shape of hollow nanoparticles obtained according to the second aspect of the present invention vary depending on the particle size and shape of the core particle. Accordingly, the production method according to the second aspect of the present invention can freely control the particle size and shape of the hollow nanoparticles by changing the particle size and shape of the core particle. Independently, the shell thickness of hollow nanoparticles obtained according to the second aspect of the present invention varies depending on the blending ratio between a coating layer material and the core particle and on hydrothermal reaction conditions. Accordingly, the production method according to the second aspect of the present invention can freely control the shell thickness of the hollow nanoparticles by adapting the above-mentioned conditions.

DESCRIPTION OF EMBODIMENTS

Embodiments of the present invention will be illustrated below with reference to the attached drawings. It should be noted, however, that the following embodiments are not intended to limit the scope of the invention and that various changes, modifications, and improvements may be made without departing from the spirit and scope of the invention.

A method for producing hollow nanoparticles according to the embodiment of the present invention produces the hollow nanoparticles by: a first step of forming core-shell particles each having a calcium-containing core particle and, on a surface of the core particle, a coating layer including amorphous silica; a second step of converting each of the coating layers of the core-shell particles into a shell mainly including calcium silicate by means of hydrothermal treatment; and a third step of removing each of the core particles from each of the core-shell particles while allowing each of the shells of the core-shell particles to remain.

In an embodiment, the first step includes the substeps of dispersing the core particle in an organic solvent; and forming a coating layer on a surface of the dispersed core particle by a sol-gel reaction with a silicon alkoxide.

A silica coating may be formed on a surface of the calcium-containing core particle by utilizing an interaction between calcium and silica.

The calcium-containing core particle before silica coating can be any one, as long as it is an inorganic nanoparticle including calcium ions, and is exemplified by calcium carbonate and calcium phosphate. The core particle has a particle size on the order of nanometers.

The organic solvent in which the calcium-containing core particle is to be dispersed may be any one, as long as it has solubility in a silicon alkoxide and water and being capable of accelerating the hydrolysis of silicon alkoxide. The organic solvent is exemplified by alcohols, glycols, glycol esters, ketones (e.g., acetone), aliphatic hydrocarbon, and aromatic hydrocarbons. These solvents may be used alone or in combination as a solvent mixture. Among them, an alcohol is preferably used as the organic solvent because alcohol can improve the interaction between the calcium phosphate particle and the silicon alkoxide and can more advantageously produce hollow nanoparticles with better efficiency.

A disperser for the dispersion of the calcium-containing core particle in dry powdery form in the organic solvent is not limited in type and is exemplified by a homomixer, homogenizer, and ultrasonic disperser. The disperser can also be a commercially available stirrer which is exemplified by HOMOGENIZING DISPER (supplied by PRIMIX Corporation), Cleamix (supplied by M Technique Co., Ltd.), and CAVITRON (supplied by Pacific Machinery & Engineering Co., Ltd.).

The silicon alkoxide for use in the silica coating may be any one, as long as being hydrolyzable to precipitate silica, and is exemplified by tetraethoxysilane, trimethoxysilane, tetramethoxysilane, triethoxysilane, tripropoxysilane, tetrapropoxysilane, tributoxysilane, and tributoxysilane.

The sol-gel reaction is preferably performed by the catalysis of a base catalyst. The base catalyst is exemplified by ammonia and amines.

The formation of the coating layer by the sol-gel reaction may be performed by adding the silicon alkoxide and the base catalyst to a mixture as a dispersion of the core particles in the organic solvent. The formed coating layer includes amorphous silica. A core-shell particle including a core particle and, on a surface thereof, a silica coating layer is prepared in the above manner.

Next, the hydrothermal treatment in the second step is performed by dispersing the core-shell particle in distilled water to give a dispersion, placing the dispersion in a pressure-tight case, and allowing the dispersion to react at a predetermined temperature for a predetermined time. This allows the silica coating layer to react with calcium of the core particle to form a shell mainly including calcium silicate.

Heating in the hydrothermal treatment is preferably performed at a temperature in the range of 80° C. to lower than 200° C. The preferred range is determined based on experimental results in the present invention. Specifically, it may take a long time for heating, if performed at a temperature of lower than 80° C., to form the shell including calcium silicate, and this degrades the productivity of the hollow nanoparticles. In contrast, heating, if performed at a temperature of 200° C. or higher, may convert not only the silica coating layer, but also the core particle into calcium silicate. The resulting core-shell particle may be a calcium silicate solid particle.

The thickness of the shell mainly including calcium silicate and formed in the second step varies depending on the silica coating layer thickness and on the hydrothermal reaction conditions. The silica coating layer thickness is in turn determined by the blending ratio between the silicon alkoxide and the core particle in the first step. Typically, the shell thickness increases with an elevating reaction temperature and/or an elongating reaction time, as demonstrated by a comparison between Examples 1 and 4 mentioned later. Independently, the shell thickness increases with an increasing amount of TEOS to be added, as demonstrated by a comparison between Examples 2 and 6.

Accordingly, the shell can have a desired thickness by adapting the silica coating layer formation conditions and the hydrothermal reaction conditions.

Pore sizes of pores present in the shell also vary depending on the hydrothermal reaction conditions. The pores in the shell can therefore have a controlled average pore size by adapting the hydrothermal reaction conditions. To allow the pores to have smaller pore sizes, the hydrothermal reaction may be performed at a higher reaction temperature and/or for a longer reaction time.

The core particle may be removed from the core-shell particle in the third step by adding an acidic aqueous solution to the core-shell particle dispersion.

The coating layer as an amorphous silica layer is formed by a sol-gel reaction with a silicon alkoxide in the first step described above. The coating layer, however, may also be formed by another process such as adsorption of amorphous silica by the surface of the core particle. In this case, the silica coating layer thickness may be determined by the blending ratio between the core particle and the silica or a material thereof to be adsorbed by the core particle surface.

Hollow nanoparticles are obtained in the above manner. The hollow nanoparticles have particle sizes on the order of nanometers, namely, have an average particle size of 30 to 300 nm and each have a shell mainly including calcium silicate.

The shell is formed by a hydrothermal reaction between silica in the coating layer and calcium in the core particle, as described above. The hydrothermal reaction causes most of the shell to be a calcium silicate crystal, but amorphous silica may partially remain in the shell. In this case, it can be said that the resulting shell includes a composite of crystalline calcium silicate and amorphous silica. The shell of the hollow particles may substantially include crystalline calcium silicate alone. The crystalline calcium silicate is specifically a crystalline calcium silicate hydrate which is exemplified by tobermorite as described in Examples. However, not only tobermorite but also xonotlite may be formed when the hydrothermal reaction is performed at a temperature higher than those in Examples.

The shell has pores and is a dense shell having an average pore size of 1 nm or less.

The shell can have a thickness of 3 to 20 nm. The experimental results in the present invention verified that the shell can have a thickness as small as 3 nm. The thickening of the shell can be freely controlled. However, hollow particles, when to be produced to have a shell thickness of greater than 20 nm, aggregated. To prevent this and to produce dispersed hollow nanoparticles, the shell preferably has a thickness of 20 nm or less.

The shape of the hollow nanoparticles varies depending on the shape of the core particle used in the first step. Typically, the resulting hollow nanoparticles can each have a spherical, spheroidal, or cubic shape by using a nanoparticle having a spherical, spheroidal, or cubic shape in dry powdery state as the core particle. As used herein the term "spherical" shape refers to not only a spherical shape but also to a shape analogous thereto. Likewise, the terms "spheroidal" (ellipsoid of revolution) and "cubic" shapes refer also to analogous shapes.

The term "average particle size" of the hollow particles refers to the average of the length (major axis) and breadth (minor axis) when the hollow particles are spheroidal; and to the length of one side when the hollow particles are cubic.

The hollow nanoparticles according to the embodiment of the present invention each have a shell mainly including calcium silicate and have biocompatibility due to the presence of calcium silicate. The hollow nanoparticles according to the embodiment of the present invention are therefore expected to be used as materials for the regeneration of bones and teeth. In this case, the hollow nanoparticles according to the embodiment of the present invention have a hollow structure and enable encapsulation of a drug solution in the hollow space, where the drug meets the above usage.

The hollow nanoparticles according to an embodiment of the present invention may have a shell including a composite of crystalline calcium silicate and amorphous silica. The shell according to this embodiment can include pores in a larger amount than that of a shell including crystalline calcium silicate, and this may possibly allow the hollow nanoparticles to encapsulate and release the drug solution more easily.

EXAMPLES

Figure 1:
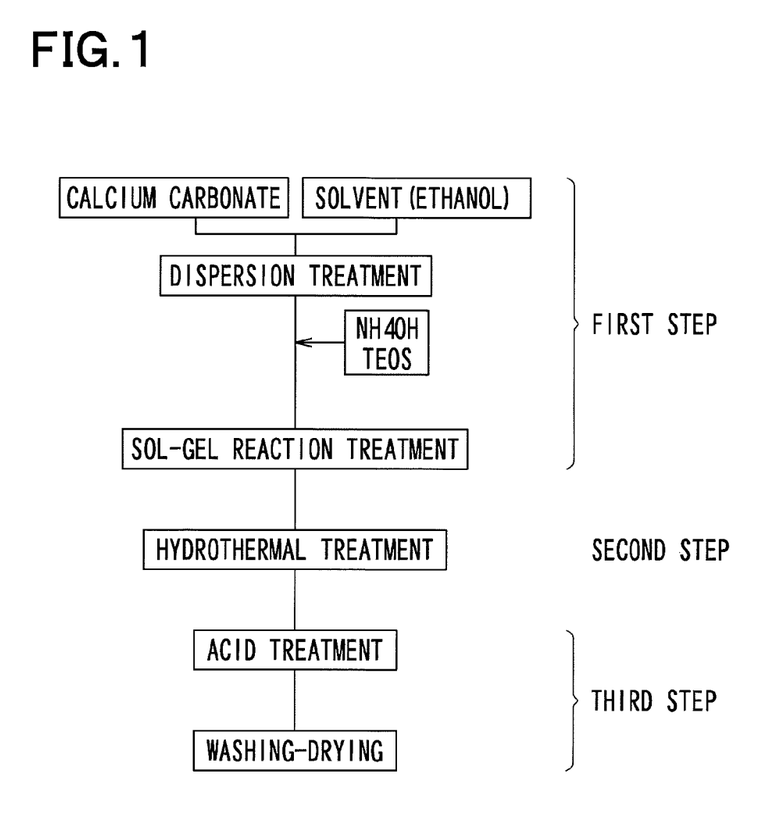
FIG. 1 is a flowchart illustrating how to produce hollow nanoparticles according to Examples 1 to 14 of the present invention.

Hollow nanoparticles according to Examples 1 to 14 as indicated in Tables 1 and 2 were produced by the production flowchart illustrated in FIG. 1.

A core particle having a cubic shape and including calcium carbonate ($CaCO_3$) was dispersed in ethanol (dispersion treatment); the dispersion was combined with tetraethoxysilane (TEOS); the resulting mixture was subjected to a sol-gel reaction by the catalysis of ammonium (28% $NH_4OH$) (sol-gel reaction treatment); and yielded a calcium carbonate particle coated with silica. Specifically, the process yielded a core-shell particle including a calcium carbonate-containing core particle and, on a surface thereof, a silica-containing coating layer.

The core particles used herein had average particle sizes of 60 nm and 150 nm in Examples 1 to 8 and Examples 9 to 14, respectively. The weight ratio between the added TEOS and $CaCO_3$, and the $NH_4OH$ concentration in the system in Examples 1 to 14 are as given in Tables 1 and 2. The sol-gel reaction was performed at room temperature for 2 hours.

The core-shell particle was thereafter transferred to a pressure-tight case and subjected to a hydrothermal treatment at a temperature for a reaction time given in Tables 1 and 2.

The core-shell particle after the hydrothermal treatment was subsequently subjected to an acid treatment using a 3 N aqueous hydrochloric acid solution to thereby dissolve and remove the core particle. The 3N aqueous hydrochloric acid solution was diluted in this process so that the weight ratio of hydrochloric acid to calcium carbonate be about 1.7.

Figure 2A:
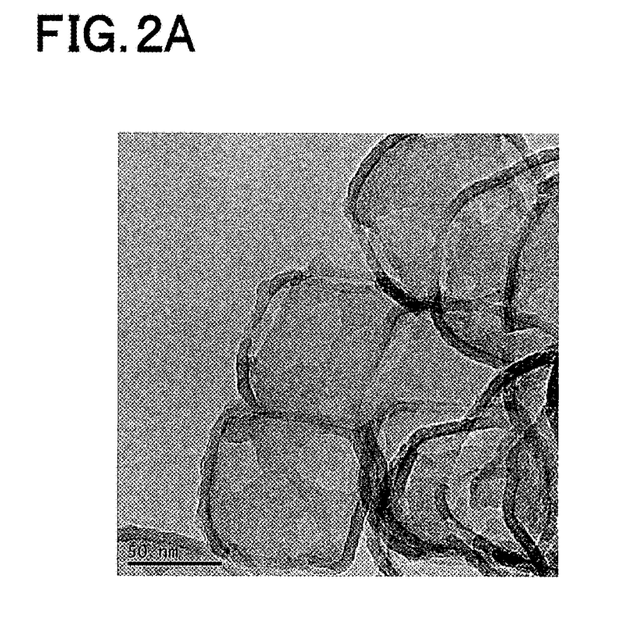
FIG. 2 is a transmission electron photomicrograph (TEM) of the hollow nanoparticles according to Example 2 of the present invention.
Figure 2B:
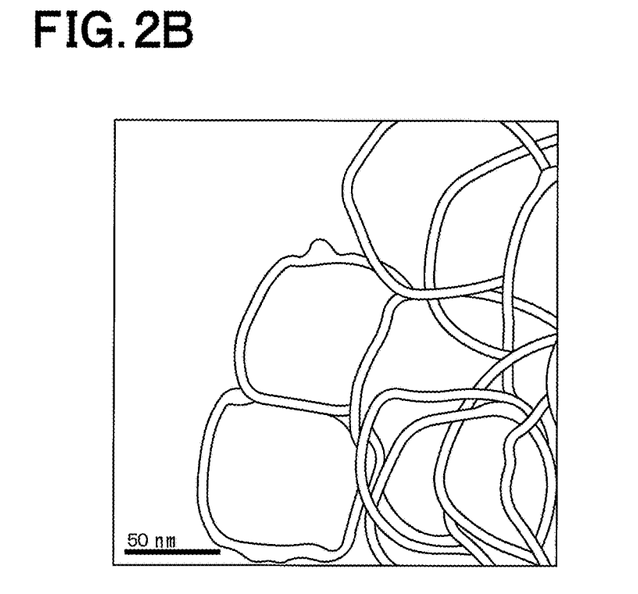
FIG. 2B is a diagrammatic illustration of the TEM photomicrograph of FIG. 2A.
Figure 3:
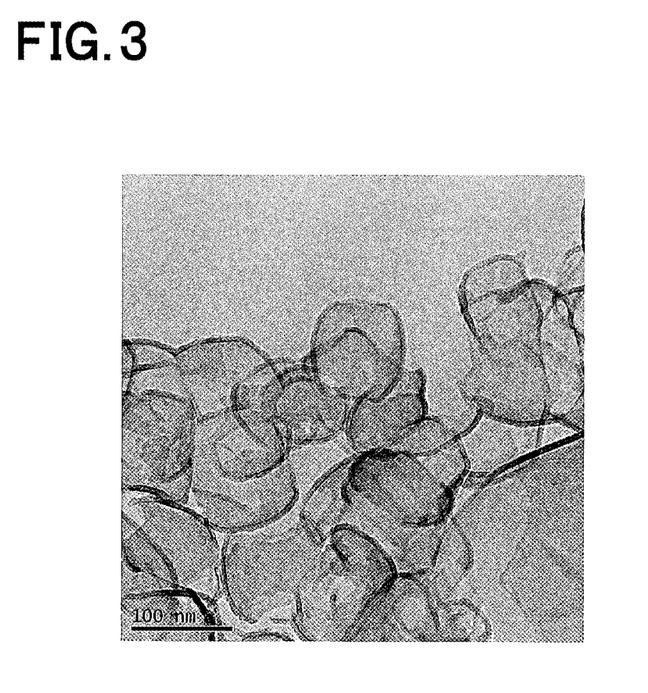
FIG. 3 is a TEM photomicrograph of the hollow nanoparticles according to Example 2 of the present invention.
Figure 4A:
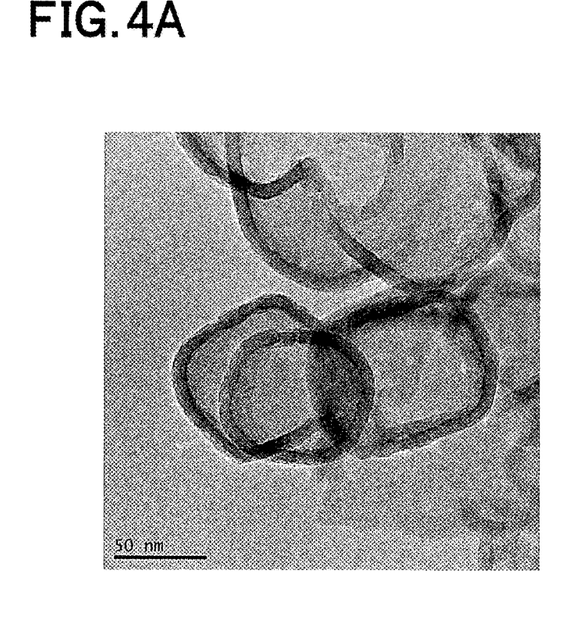
FIG. 4A is a TEM photomicrograph of the hollow nanoparticles according to Example 3 of the present invention.
Figure 4B:
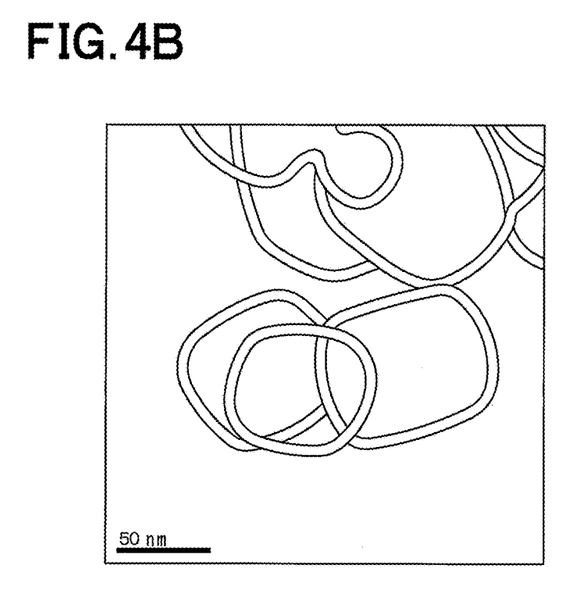
FIG. 4B is diagrammatic illustration of the TEM photomicrograph of FIG.
Figure 5:
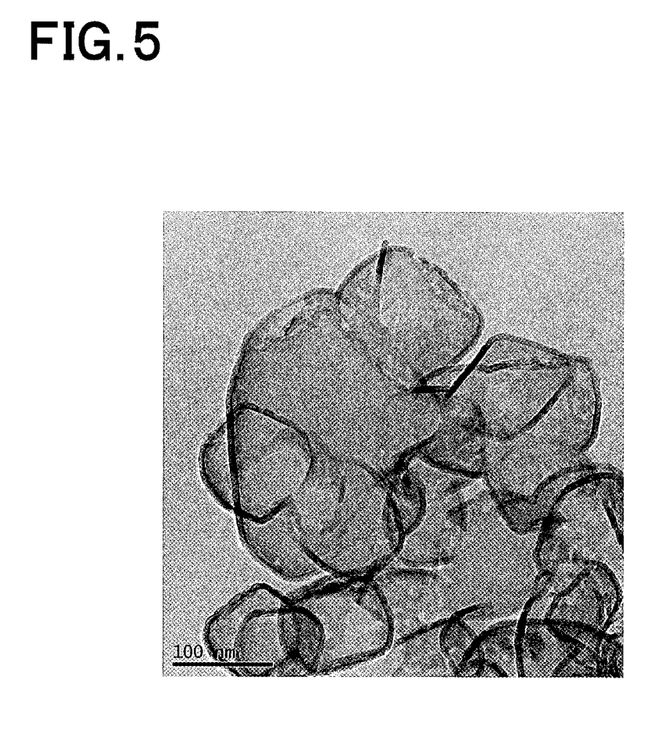
FIG. 5 is a TEM photomicrograph of the hollow nanoparticles according to Example 3 of the present invention.

The particle after the acid treatment was washed with distilled water. After checking that the washings became neutral, the solvent was replaced with ethanol, the particle was dried, and yielded a series of target samples. FIGS. 2A, 2B, and 3 illustrate hollow nanoparticles produced in Example 2; and FIGS. 4A, 4B, and 5 illustrate hollow nanoparticles produced in Example 3. The samples obtained in Examples 1 to 14 were hollow nanoparticles as illustrated in these figures.

The obtained samples were subjected to analyses and measurements. Whether or not a shell including calcium silicate was formed was examined by X-ray diffractometry to determine whether a diffraction peak assigned to $Ca(OH)_2$—$SiO_2$ (tobermorite) appeared. The measurement was performed with RINT 1000 supplied by Rigaku Corporation using $CuK\alpha$ at 30 kV and 20 mA and at a scan rate of 2°/min. The particle size and shell thickness of the hollow particles were measured based on photomicrographs taken with a transmission electron microscope (TEM); whereas the average size of pores present in the shell was calculated from a nitrogen gas adsorption isotherm according to the Barrett- Joyner-Halenda (BJH) method. As used herein the term "particle size" of a hollow particle refers to the outer diameter of the hollow particle after the acid treatment. Specifically, ten particles were randomly selected in the TEM photomicrograph, the outer diameters of the ten particles were measured and averaged, and the average was defined as the average particle size [nm]. Likewise, an average shell thickness was calculated and defined as the shell thickness.

according to Examples 1 to 14, because a diffraction pattern assigned to amorphous $SiO_2$ (silica) was observed.

In contrast, the formation of calcium silicate was not verified in Comparative Examples 1 to 6. Specifically, hollow particles according to Comparative Examples 1 and 2 were obtained without hydrothermal treatment; and hollow particles according to Comparative Examples 3 to 6 were obtained each by a hydrothermal treatment for a reaction time shorter than those in Examples 1 to 4.

TABLE 1

| | Silica coating | | Hydrothermal treatment conditions | | Properties of particles after core removal | | | |
|---|---|---|---|---|---|---|---|---|
| | Weight ratio of TEOS to $CaCO_3$ | $NH_4OH$ concentration [percent by weight] (weight [g]) | Reaction temperature [° C.] | Reaction time [hour] | Calcium silicate shell | Average particle size [nm] | Average shell thickness [nm] (shell thickness distribution [nm]) | Average pore size [nm] |
| Example 1 | 0.3 | 7.7 (1.0) | 90 | 120 | formed | 95.5 | 7.5 (7-9) | <1 |
| Example 2 | 0.3 | 7.7 (1.0) | 90 | 240 | formed | 96.8 | 7.7 (7-9) | <1 |
| Example 3 | 0.3 | 7.7 (1.0) | 120 | 240 | formed | 97.8 | 10.9 (10-12) | <1 |
| Example 4 | 0.3 | 7.7 (1.0) | 120 | 360 | formed | 98.8 | 11.2 (11-13) | <1 |
| Comparative Example 1 | 0.3 | 7.7 (1.0) | 25 | 2 | not formed | — | — | 2.0 |
| Comparative Example 2 | 0.3 | 7.7 (1.0) | 25 | 8 | not formed | — | — | 1.5 |

TABLE 2

| | Silica coating | | Hydrothermal treatment conditions | | Properties of particles after core removal | | |
|---|---|---|---|---|---|---|---|
| | Weight ratio of TEOS to $CaCO_3$ | $NH_4OH$ concentration [percent by weight] (weight [g]) | Reaction temperature [° C.] | Reaction time [hour] | Calcium silicate shell | Average particle size [nm] | Average shell thickness [nm] |
| Example 5 | 0.3 | 7.7 (1.0) | 150 | 240 | formed | 97.0 | 7.5 |
| Example 6 | 0.6 | 7.7 (1.0) | 90 | 240 | formed | 96.8 | 9.5 |
| Example 7 | 0.6 | 7.7 (1.0) | 120 | 240 | formed | 97.2 | 9.8 |
| Example 8 | 0.6 | 7.7 (1.0) | 150 | 240 | formed | 96.5 | 9.4 |
| Example 9 | 0.8 | 7.7 (1.0) | 90 | 240 | formed | 178.0 | 12.5 |
| Example 10 | 0.8 | 7.7 (1.0) | 120 | 240 | formed | 185.3 | 13.7 |
| Example 11 | 0.8 | 7.7 (1.0) | 150 | 240 | formed | 183.0 | 13.4 |
| Example 12 | 1.2 | 7.7 (1.0) | 90 | 240 | formed | 186.2 | 16.0 |
| Example 13 | 1.2 | 7.7 (1.0) | 120 | 240 | formed | 191.2 | 16.9 |
| Example 14 | 1.2 | 7.7 (1.0) | 150 | 240 | formed | 190.9 | 15.9 |
| Comparative Example 3 | 0.3 | 7.7 (1.0) | 90 | 3 | not formed | — | — |
| Comparative Example 4 | 0.3 | 7.7 (1.0) | 90 | 9 | not formed | — | — |
| Comparative Example 5 | 0.3 | 7.7 (1.0) | 120 | 3 | not formed | — | — |
| Comparative Example 6 | 0.3 | 7.7 (1.0) | 120 | 9 | not formed | — | — |

It was verified that the average particle size and shape of the hollow nanoparticles obtained in Examples 1 to 14 varied depending on the particle size and shape of the core particle, as is demonstrated by the TEM photomicrographs as in FIGS. 2A and 4A and the average particle sizes of particles after core removal indicated in Tables 1 and 2.

Figure 6:
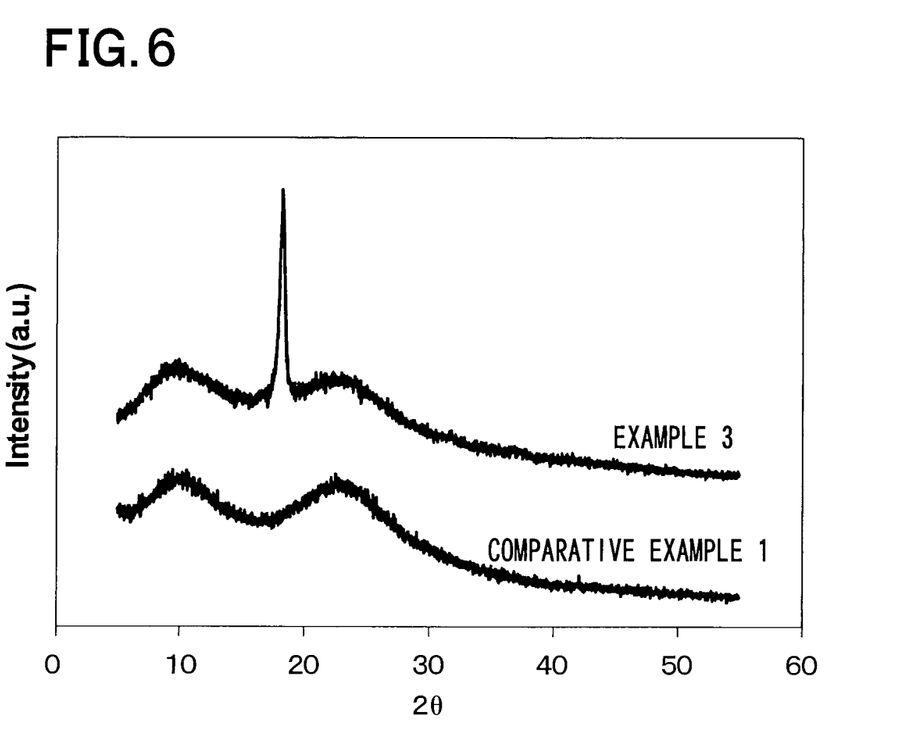
FIG. 6 depicts results of X-ray diffractometry (XRD) on hollow nanoparticles according to Example 3 of the present invention and those according to Comparative Example 1.

As is demonstrated by FIG. 6, the formation of calcium silicate (tobermorite) was verified in Examples 1 to 14. As is also demonstrated by FIG. 6, the presence of amorphous silica in the shell was verified in the hollow particles The hollow particles obtained in Examples 1 to 14 were immersed in a phosphate buffer and were found to undergo precipitation of calcium phosphate crystals containing an apatite structure on the surface of the hollow particles. The precipitation of the calcium phosphate crystals occurred because calcium ions were dissolved from the shell of the hollow nanoparticles and reacted with phosphate ions. The precipitation of calcium phosphate crystals verified that the hollow nanoparticles according to the embodiment of the present invention have not only biocompatibility but also bioactivity.

INDUSTRIAL APPLICABILITY

The present invention can provide hollow particles each including a dense shell including calcium silicate with various shapes and with sizes on the order of nanometers. The hollow particles are usable as supports typically for drugs, cosmetic components, catalysts, fertilizers, and flavors by utilizing the biocompatibility and chemical stability of calcium silicate.

The invention claimed is:

1. A method for producing hollow nanoparticles having an average particle size of 30 to 300 nm and each comprising a shell mainly comprising calcium silicate, the method comprising:
    forming core-shell particles each comprising a core particle containing calcium and, on a surface of the core particle, a coating layer comprising amorphous silica;
    converting each coating layer of each core-shell particle into a shell mainly comprising calcium silicate by hydrothermal treatment of the core-shell particles at a hydrothermal treatment temperature in a range of equal to or greater than 150° C. and less than 200° C. for a hydrothermal treatment period of at least 120 hours; and
    removing each core particle from each core-shell particle while allowing each shell of each core-shell particle to remain.

2. The method for producing the hollow nanoparticles according to claim 1, wherein the forming of the core-shell particles comprises:
    dispersing each core particle in an organic solvent; and
    forming each coating layer on a surface of each dispersed core particle by a sol-gel reaction with a silicon alkoxide.

3. The method for producing the hollow nanoparticles according to claim 1, wherein the hydrothermal treatment period is at least 240 hours.

* * * * *